United States Patent
Suzuki

(10) Patent No.: US 8,103,318 B1
(45) Date of Patent: *Jan. 24, 2012

(54) METHOD AND SYSTEM FOR RECOVERING FROM DRX TIMING DE-SYNCHRONIZATION IN LTE_ACTIVE

(75) Inventor: Takashi Suzuki, Ichikawa (JP)

(73) Assignee: Research In Motion Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/272,439

(22) Filed: Oct. 13, 2011

Related U.S. Application Data

(63) Continuation of application No. 11/674,689, filed on Feb. 14, 2007, now Pat. No. 8,072,963.

(51) Int. Cl.
*H04M 1/00* (2006.01)

(52) U.S. Cl. ......... 455/574; 370/310; 370/350; 455/458
(58) Field of Classification Search ............... 370/350, 370/310; 455/458
See application file for complete search history.

(56) References Cited

U.S. PATENT DOCUMENTS

2004/0023672 A1* 2/2004 Terry ........................... 455/458
* cited by examiner

*Primary Examiner* — Charles Shedrick
(74) *Attorney, Agent, or Firm* — Moffat & Co.

(57) ABSTRACT

A method for recovering from discontinuous reception (DRX) timing de-synchronization between the UE and the eNB in an LTE_ACTIVE state having the steps of: the eNB detecting DRX timing de-synchronization; transmitting an indicator to a User Equipment (UE) to resume continuous reception; and waiting for an indication from the UE of whether a Continuous Reception Response or Continuous Reception Notification was received.

16 Claims, 8 Drawing Sheets

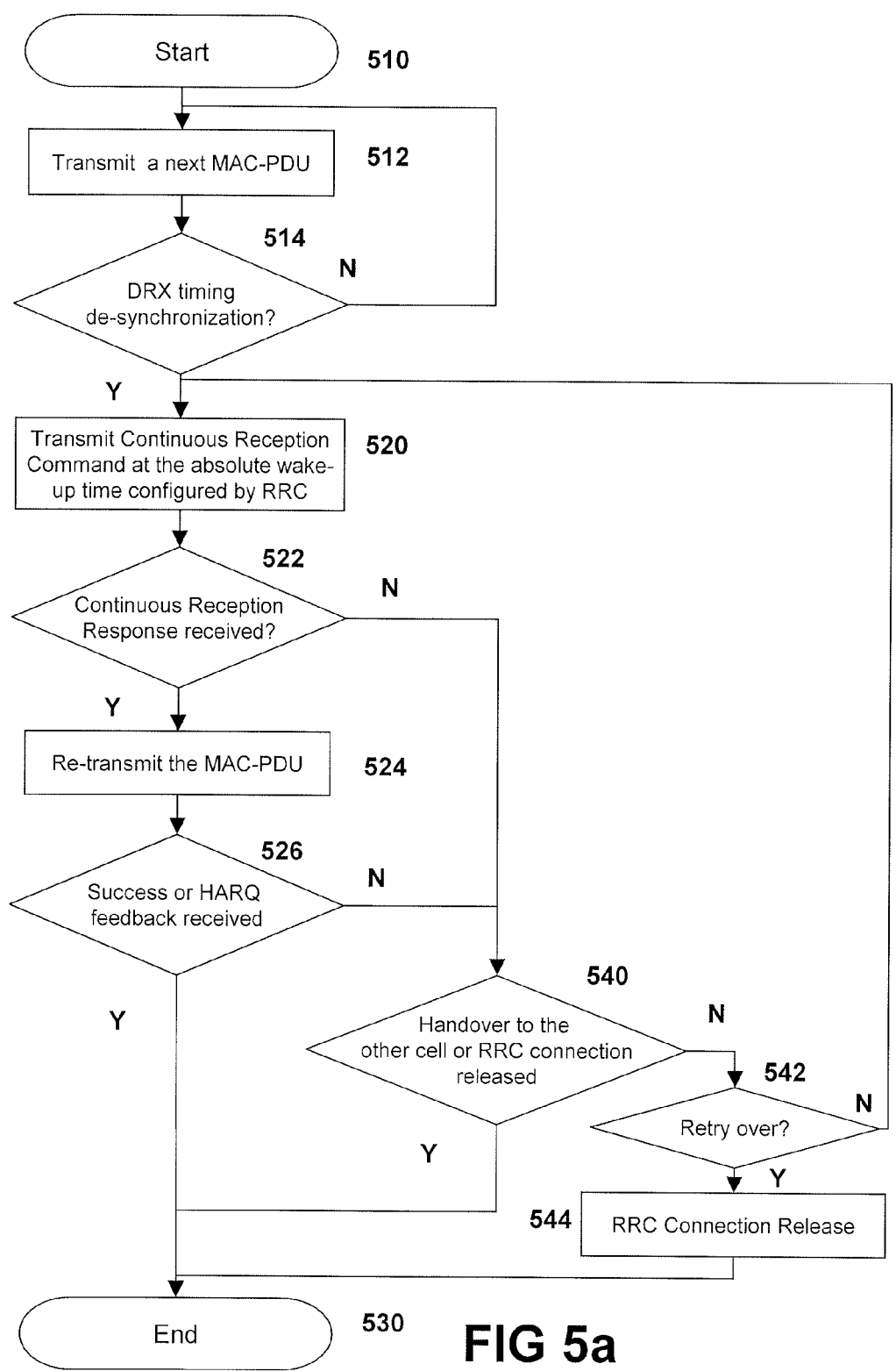

METHOD AND SYSTEM FOR RECOVERING FROM DRX TIMING DE-SYNCHRONIZATION IN LTE_ACTIVE

RELATED APPLICATIONS

The present application is a continuation of U.S. patent application Ser. No. 11/674,689, filed Feb. 14, 2007, the entire contents of which are incorporated herein by reference.

FIELD OF THE DISCLOSURE

The present disclosure relates to the long-term evolution (LTE) of third generation partnership project (3GPP), and in particular, to DRX timing de-synchronization in an LTE_ACTIVE state.

BACKGROUND

In the long-term evolution infrastructure, a UE can be in one of two radio resource control (RRC) states. These are LTE_IDLE and LTE_ACTIVE.

The UE can be configured for discontinuous reception (DRX) in both the LTE_IDLE and the LTE_ACTIVE states. In the LTE_IDLE state, the DRX allows the UE to synchronize its listening period to a known paging cycle of the network. By synchronizing the listening period, the UE can turn off its radio transceiver during the standby period, thereby significantly saving battery resources. DRX parameters allow the mobile to synchronize with the network and to know that it will not receive another signal until a specified time has elapsed.

It is proposed at the 3GPP TSG-RAN working group that DRX also be used when the UE is in LTE_ACTIVE state. It is further proposed that when in discontinuous reception (DRX) by the user equipment (UE) in LTE_ACTIVE state, that a regular DRX configuration is signaled by a radio resource control (RRC) protocol message and a temporary DRX (re) configuration is signaled by medium access control (MAC) signaling, for example, in the MAC protocol data unit (MAC-PDU) header or MAC control PDU.

In LTE, before user data is sent on a downlink shared channel, the eNB will send a scheduling indication on the downlink shared control channel (DLSCCH) providing the parameters that the UE will use to demodulate the data. However, if the UE misses that DLSCCH scheduling indication, the UE will not know to receive the user data and, hence, will not know to acknowledge (ACK) or negatively ACK (NACK) the user MAC-PDU. The eNB will be awaiting the ACK or NACK, i.e. hybrid ARQ (HARQ), response. When it does not get that response, it is considered a discontinuous transmission (DTX). If the data indication on the downlink shared control channel (DLSCCH) is missed by the UE and the subsequent discontinuous transmit (DTX) on the HARQ feedback channel is misinterpreted as an ACK by the enhanced node B (eNB), a MAC-PDU may be lost. Moreover, if UE automatically increments DRX length according to a rule, e.g. no data activities in a certain duration, the eNB will maintain its current DRX value while the UE will increment its own DRX value. This results in DRX timing de-synchronization, i.e. the eNB and the UE are operating on different DRX periods.

As will be appreciated, this increases the downlink message delivery latency and wastes downlink radio resources. Longer delivery latency should be avoided, especially for critical downlink control messages. Once DRX timing de-synchronization occurs, the eNB has to determine the UE DRX timing in order to send new data to the UE. The eNB may achieve this by sending various probing messages to the UE at those times when it knows the UE may possibly be awake. It will, after a few attempts, find the UE DRX timing, and awaken the UE in order to regain synchronization.

BRIEF DESCRIPTION OF THE DRAWINGS

The present disclosure will be better understood with reference to the drawings in which:

FIG. 5a is a flow chart showing a method of preconfigured wake up time recovery from possible DRX timing de-synchronizations from the eNB perspective.

DETAILED DESCRIPTION

Figure 1:
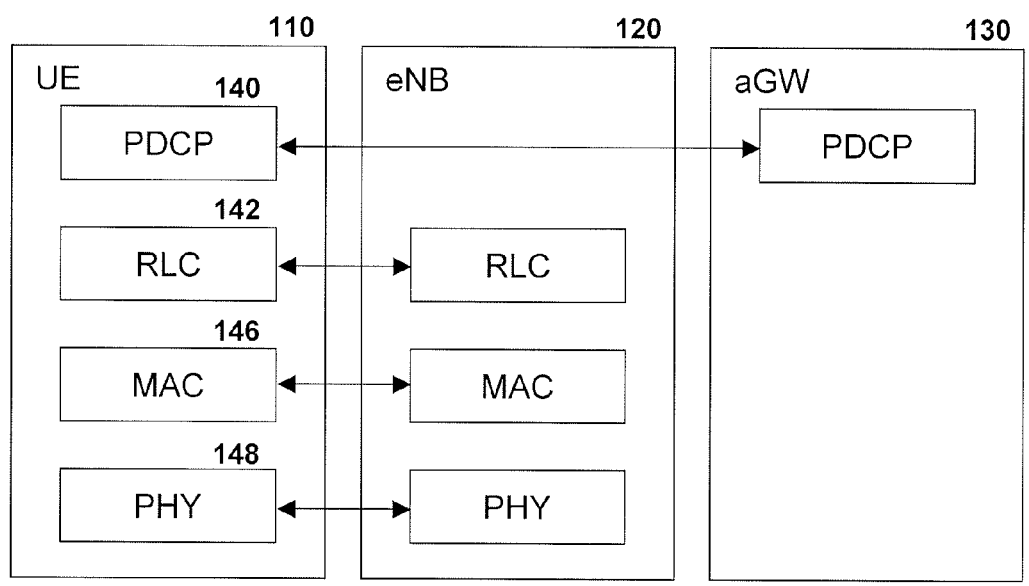
FIG. 1 is a block diagram showing a long-term evolution user plane protocol stack.

In the case that the UE is in LTE_ACTIVE and DRX is activated, on the arrival of downlink data the eNB transmits a scheduling indication on the DLSCCH and transmits MAC-PDUs on the DL-SCH at the time when the UE should be awake. If the eNB gets no hybrid automatic repeat request (HARQ) feedback signals from the UE, the eNB may consider that the UE is out of synchronization in DRX timing. In order to recover from such a state, two methods are described below.

A first method is the indication of DRX timing de-synchronization in system information. Specifically, when the eNB detects that the UE is out of synchronization in DRX timing, the eNB broadcasts the radio network temporary identifiers (RNTI) of the UE in a predefined system information block. When the UE wakes up, it reads the system information block. If the RNTI of the UE is indicated, the UE deactivates the DRX mode and transmits Continuous Reception Notification messages using L1/L2 signaling or MAC signaling to the eNB. On reception of the Continuous Reception Notification message, the eNB will retransmit the data waiting in its buffer to the UE. When the data is acknowledged or the HARQ feedback from the UE is received, the eNB removes the RNTI from the system information.

In a further embodiment, a method for recovering from DRX de-synchronization is to pre-configure an absolute wake up time. Specifically, when a radio bearer for the interactive or background communication is established or DRX is activated on that bearer; absolute wake up timing can be indicated to the UE by the RRC. The absolute wake-up timing is defined by the radio frame offset (ARFoff) to the system radio frame timing and DRX interval (AInt). Regardless of the current DRX setting, the UE must wake up at the radio frame of ARFoff+N*AInt, where N=0, 1, . . . . If the eNB wants to guarantee the recovery within 2.56 seconds, then the AInt is set to 2.56 seconds.

When the eNB detects that the UE is out of synchronization in DRX timing, the eNB sends a Continuous Reception Command (i.e. DRX deactivation) in L1/L2 signaling or MAC signaling to the UE at the absolute wake up time. When the UE wakes up at the absolute wake up time, it checks if a Continuous Reception Command is received or not. If so, the UE turns on the power on the transceiver, goes back to continuous reception, obtains the uplink synchronization and scheduling grant if necessary, and sends a Continuous Reception Response to the eNB. On reception of the Continuous Reception Response, the eNB will transmit the data in its buffer to the UE.

In case the eNB wants the UE to readjust the uplink synchronization, the eNB sends the Continuous Reception Command over the L1/L2 signaling channel, which contains an indication that uplink synchronization should be readjusted and the information regarding the dedicated uplink resource allocated for Continuous Reception Response. Upon reception of such Continuous Reception Command, the UE readjusts the uplink timing and responds by sending Continuous Reception Command using the resource indicated in the Continuous Reception Command.

In a further alternative embodiment, the absolute wake up radio frame offset can be calculated from the UE identities such as IMSI (International Mobile Station Identity) in a similar manner that paging occasion is calculated in UMTS as described in 3GPP TS25.304. In this case, the DRX interval may be included in the system information rather than signaled via dedicated RRC messages.

The present disclosure therefore provides a method for recovering from discontinuous reception (DRX) timing de-synchronization in an LTE_ACTIVE state comprising the steps of: detecting DRX timing de-synchronization; transmitting an indicator to a User Equipment (UE) to resume continuous reception; and waiting for an indication of whether a Continuous Reception Response was received.

The present disclosure further provides a method for going to continuous reception in User Equipment due to a discontinuous reception (DRX) timing de-synchronization in an LTE_ACTIVE state comprising the steps of: waking up from DRX; checking an indicator to determine whether to go to continuous reception; and if an indicator exists to go to continuous reception, deactivating DRX, going to continuous reception and transmitting a continuous reception response.

The present disclosure further provides an enhanced Node B (eNB) adapted to recover from discontinuous reception (DRX) timing de-synchronization in an LTE_ACTIVE state, characterized by: means for detecting DRX timing de-synchronization; means for transmitting an indicator to a User Equipment (UE) to resume Continuous Reception; and means for waiting for an indication of whether a Continuous Reception Response was received.

The present disclosure further provides User Equipment (UE) adapted to go to continuous reception due to a discontinuous reception (DRX) timing de-synchronization in an LTE_ACTIVE state, characterized by: means for waking up from DRX; means for checking an indicator to determine whether to go to continuous reception; and means for deactivating DRX, going to continuous reception and transmitting a Continuous Reception Response if an indicator exists to go to continuous reception.

Reference is now made to the drawings. FIG. 1 shows a block diagram illustrating the long-term evolution (LTE) user plane protocol stack.

A UE 110 communicates with both an evolved Node B (eNB) 120 and an access gateway (aGW) 130.

Various layers are illustrated in the protocol stack. The packet data convergence protocol (PDCP) layer 140 is illustrated both on the UE 110 and on aGW 130. The PDCP layer 140 performs internet protocol (IP) header compression and decompression, encryption of user data, transfer of user data and maintenance of sequence numbers (SN) for radio bearers.

Below the PDCP layer 140 is the radio link control protocol layer 142, which communicates with the radio link control protocol layer 142 on the eNB 120. As will be appreciated, communication occurs through the physical layer in protocol stacks such as those illustrated in FIGS. 1 and 2. However, RLC-PDUs from the RLC layer 142 of the UE are interpreted by the RLC layer 142 on the eNB 120.

Below RLC layer 142 is the medium access control (MAC) data communication protocol layer 146. As will be appreciated by those skilled in the art, the RLC and MAC protocols form the data link sublayers of the LTE radio interface and reside on the eNB in LTE and user equipment.

The layer 1 (L1) LTE (physical layer 148) is below the RLC/MAC layers 144 and 146. This layer is the physical layer for communications.

Figure 2:
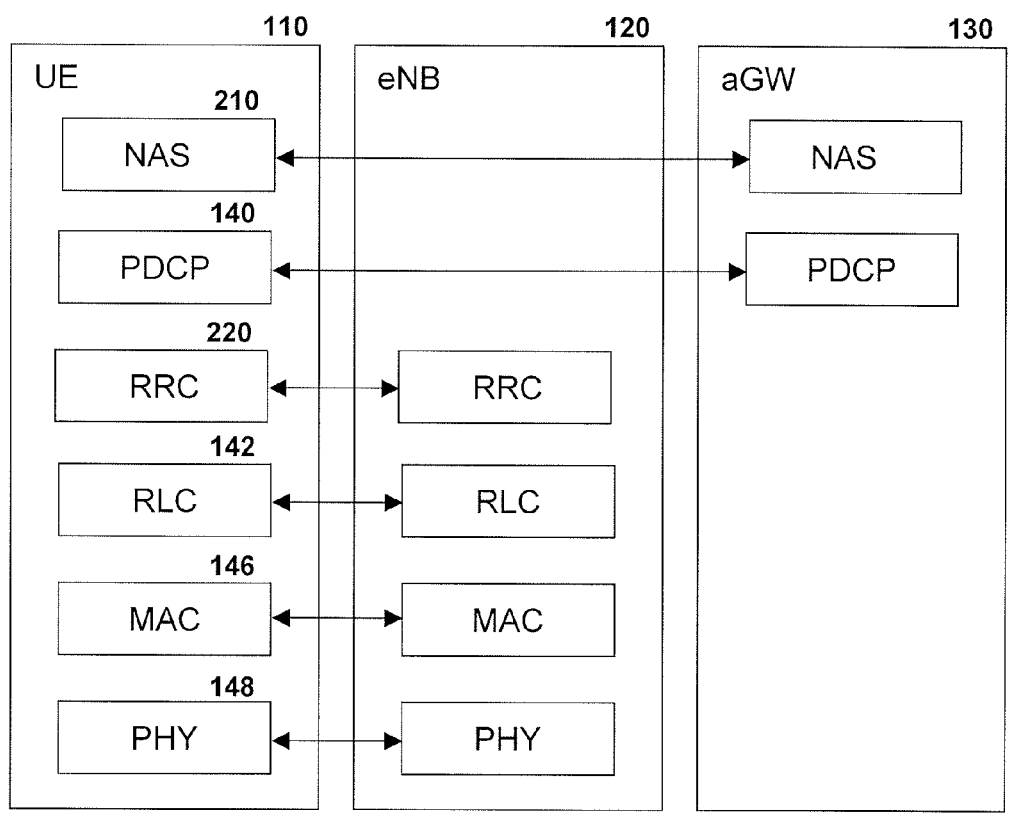
FIG. 2 is a block diagram showing a long-term evolution control plane protocol stack.

Referring to FIG. 2, FIG. 2 illustrates the LTE control plane protocol architecture. Similar reference numerals to those used in FIG. 1 will be used in FIG. 2. Specifically, UE 110 communicates with eNB 120 and aGW 130. Further, physical layer 148, MAC layer 146, RLC layer 142 and PDCP layer 140 exist within FIG. 2.

FIG. 2 also shows the non-access stratum (NAS) layer 210. As will be appreciated, NAS layer 210 could include mobility management and session management.

The radio resource control protocol layer (RRC) 220, is the part of the protocol stack that is responsible for the assignment, configuration and release of radio resources between the UE and the E-UTRAN (Evolved universal terrestrial radio access network). The basic functionalities of RRC protocol for LTE is described in 3GPP TR25.813.

As will be appreciated by those skilled in the art, in UMTS, automatic repeat request (ARQ) functionality is carried out within the RLC layer which resides in the radio network controller (RNC). Long Term Evolution (LTE) moves the ARQ functionality from the RNC to eNB where a tighter interaction may exist between the ARQ and the HARQ (within the MAC layer, also located in the eNB).

Various issues regarding DRX in an LTE-ACTIVE state are considered herein.

DRX Signaling Procedure

Very efficient signaling procedures for activating and de-activating DRX and specifying the duration of DRX periods are required in order to support a large population of UEs in a cell that are utilizing DRX in an LTE_ACTIVE state.

As will be appreciated by those skilled in the art, if the evolved Node B (eNB) transmits data to the UE during its receiver off period due to a DRX operation, the UE cannot receive the data. Therefore, special effort is required to ensure the UE and the eNB are synchronized regarding when DRX is activated and deactivated.

The indication between the eNB and the UE can be explicitly signaled by the radio resource control (RRC) or layer 1/layer 2 (L1/L2) signaling. As will be appreciated, however, explicit signaling may not be as efficient as desired.

A more efficient solution is to include an optional field in the MAC header of a MAC-PDU (MAC Protocol Data Unit) or a MAC control PDU (MAC PDU which contains only MAC control information) to indicate DRX activation and deactivation. The field preferably indicates the DRX value and timing margin for activation and deactivation. A value of zero, for example, could mean DRX deactivation in the DRX value field in a preferred embodiment. Conversely, if data that is to be transmitted in the next MAC-PDU is the last one in the buffer for the UE, the eNB may extend the MAC header field to include a DRX length initial value. For example, this could be 320 milliseconds.

Several different methods for signaling the DRX period within the MAC-PDU header can be envisaged. For example, three bits may be added to the MAC header to indicate eight values of the DRX period. Thus, rather than a specific time value being sent, a bit value from 000 to 111 could indicate one of eight discrete values.

In an alternative, a smaller field in the MAC header could be used (for example two bits) to indicate increment or decrement. The RRC could indicate default values, and if the MAC header indicates increment or decrement then the UE could change to the pre-specified value, according to the received indication. Similarly, the RRC could define the mapping between the actual DRX value and the value contained in the smaller field.

Once the UE receives the DRX value, it acknowledges it to the eNB by transmitting HARQ ACK and starts the DRX at the appropriate system frame considering propagation delay and processing delay at the eNB. When the eNB receives the ACK from the UE, it also starts the DRX at the appropriate system frame time. As will be appreciated, the eNB does not turn off its transceiver, but simply knows not to transmit messages to the individual UE.

During the awake cycle of a DRX period, if new data has arrived at the eNB for transmission, the eNB can send a MAC-PDU with a header extension set to DRX deactivation or a shorter DRX length depending on the amount of data in the buffer or the quality of service requirements. The UE reconfigures the DRX accordingly and acknowledges the MAC-PDU. When the eNB receives the ACK, it reconfigures the DRX. As indicated above, the deactivation could be accomplished by merely setting the length value to zero.

Figure 3A:
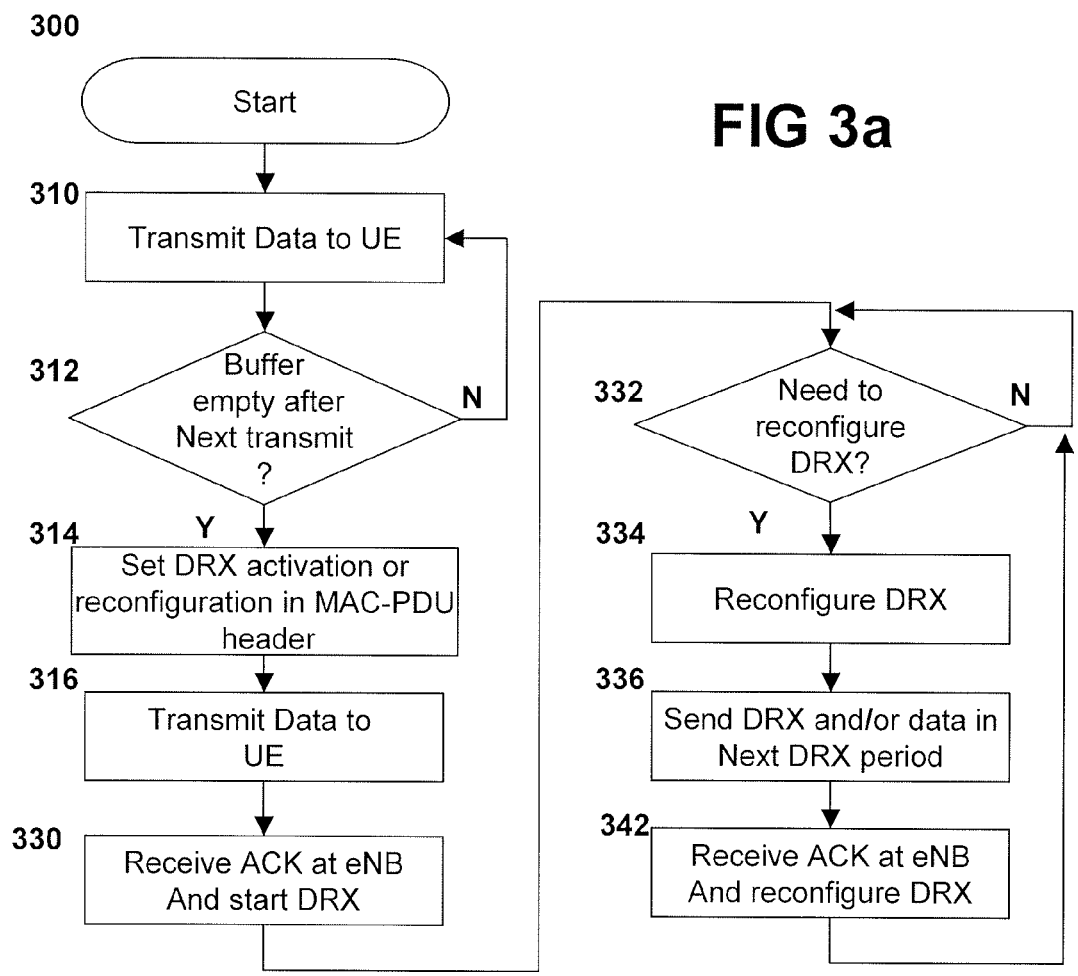
FIG. 3a is a flow chart showing a method to activate, deactivate and reconfigure a DRX period using a MAC-PDU header or MAC control PDU from the eNB side.
Figure 3B:
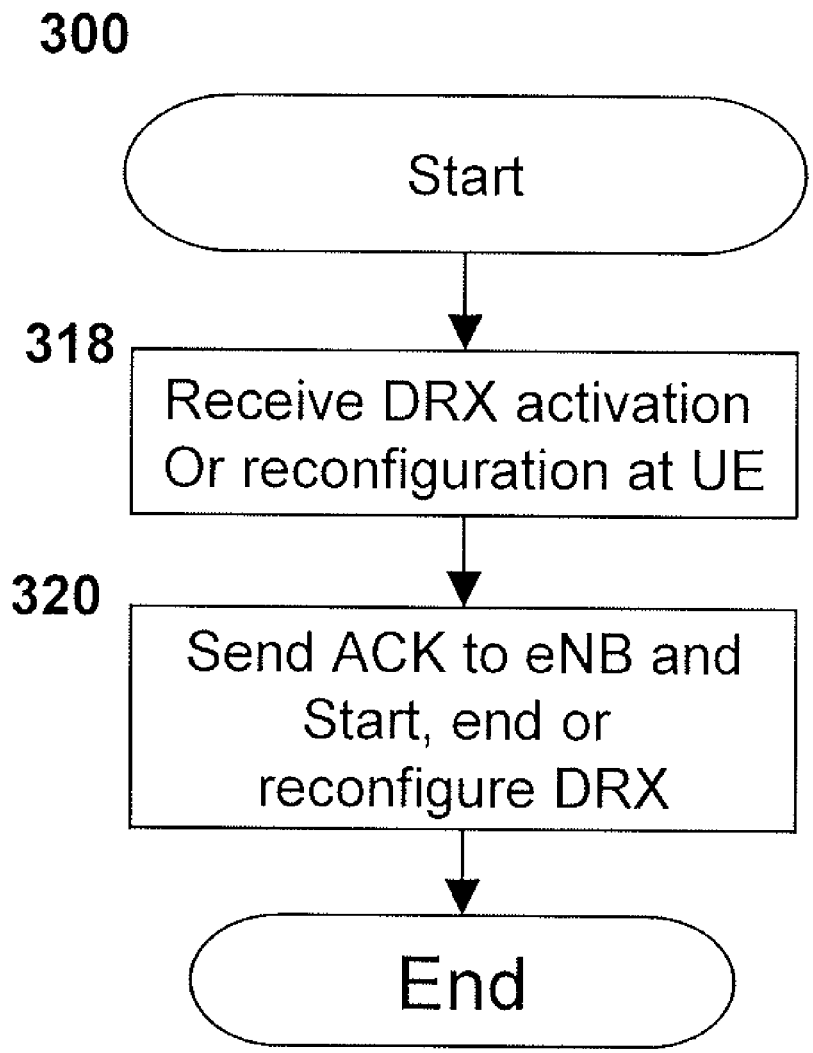
FIG. 3b is a flow chart showing a method to acknowledge deactivation, deactivation or reconfiguration of DRX period from the UE side.

Reference is now made to FIGS. 3a and 3b. FIG. 3a shows an exemplary method for controlling DRX activation in the LTE_ACTIVE state. The process starts at step 300 and proceeds to step 310 in which data is transmitted to the UE. As will be appreciated by those skilled in the art, data transmission in the LTE_ACTIVE state utilizes the MAC-PDU at the data link layer to transmit the data.

The process next proceeds to step 312 in which a check is made to see whether the buffer of data to be sent to the UE will be empty after the next transmit. If no, the process proceeds back to step 310 in which data is transmitted to the UE. Alternatively, if the buffer will be empty after the next transmit and the data arrival rate is lower than a threshold value, the process proceeds to step 314.

In step 314, the eNB sets DRX activation in the MAC-PDU header. As indicated above, this includes a DRX activation value indicating the length of the DRX period and DRX activation time if needed, e.g., the system radio frame number when the DRX activation should be performed. In another embodiment the eNB may simply indicate an increase in the DRX interval. The UE reconfigures the existing DRX interval to a predetermined reduced interval. The predetermined interval may be either known to both eNB and UE or pre-signaled to the UE from the eNB via explicit signaling; either by system broadcast or RRC signaling.

The process then proceeds to step 316 in which the data including the modified MAC-PDU header is sent to the UE.

Reference is now made to FIG. 3b. In step 318, the UE receives the data and sees that DRX activation is specified in the MAC-PDU header. The process proceeds to step 320 in which the UE sends an acknowledgement (ACK) to the eNB and starts the DRX at the appropriate system frame considering propagation delay and processing delay at the eNB. If the activation time of the specified DRX is indicated in the received MAC-PDU header, both the UE and the eNB apply the new DRX value at that time.

In step 330 of FIG. 3a, the eNB receives the ACK from the UE and starts the DRX at the same appropriate system frame.

As will be appreciated, the DRX can continue until various events occur which may require the DRX to be adjusted. One event is the reception of data from the aGW by the eNB for the UE. Depending on the amount of data received, the DRX can either be deactivated or the period of the DRX can be reduced. Other events that may require the adjustment of the DRX include a change of signal power level between the eNB and the UE or possibly a gradual increase in the DRX cycle due to continued data inactivity, among others.

In step 332 the eNB checks to see whether the DRX needs to be adjusted. As indicated above, this could be the situation where data is received to be sent to the UE. Here the DRX can either be deactivated or the period adjusted.

From step 332, if the DRX does not need to be adjusted, the process proceeds back to step 332 and continues to check whether or not the DRX needs to be adjusted.

Once the process in step 332 finds that the DRX does need to be adjusted, the process proceeds to step 334 in which it adjusts the DRX. This could be deactivating the DRX by transmitting a zero value for the DRX or a shorter DRX or a longer DRX as required.

The MAC-PDU with the modified header (including modified DRX value and the activation time for new DRX value if needed) is sent to the UE in step 336. The MAC-PDU in step 336 could also include any data that has been received by the eNB that needs to be transmitted to the UE. If no data is included then the MAC-PDU is considered a MAC control PDU.

Referring to FIG. 3b, the process then proceeds to step 318 in which the MAC-PDU with modified header is received at the UE. The UE recognizes the DRX period is to be adjusted and in step 320 it sends an acknowledgement to the eNB and it adjusts its DRX period at the appropriate system frame considering propagation delay and processing delay as at the eNB. If the activation time is indicated in the MAC-PDU header, both the UE and the eNB apply the new DRX value at that time.

Referring to FIG. 3a, in step 342 the eNB receives the ACK and starts the modified DRX period at the same appropriate system frame. The process then proceeds back to step 332 to see whether the DRX needs to be adjusted again.

As will be appreciated by those skilled in the art, one issue with the above occurs in the case of a misinterpretation of an ACK or a NACK. Specifically, the transmitter's hybrid automatic repeat request (HARQ) entity, which is a variation of the ARQ error control method, does not always properly demodulate an ACK or a NACK possibly due to poor channel conditions. Thus, in some situations, one can be interpreted as the other. By having the DRX activation and deactivation occur in the MAC-PDU header, an ACK to NACK or NACK to ACK misinterpretation needs to be handled as misinterpretation of control information signaled between an eNB and a UE can lead to loss of data or possibly radio connection.

DRX Automatic Incrementation

A further consideration is the incremental extension of the DRX. Rules that dictate how the DRX period can be incremented or decremented (e.g. by factors of two), in a preferred embodiment, can be signaled during the radio bearer (RB) set up. The rules are carried in the RRC RB set-up/reconfiguration or measurement control messages to the UE. In this case, if no data is received after N current DRX cycles, the eNB and the UE increase the DRX length to the next larger value automatically. This eliminates the need for signaling between the eNB and the UE to increase the DRX length and therefore saves network and battery resources.

Indication of DRX Timing De-Synchronization in System Information

When the eNB determines that the UE is out of synchronization within its DRX timing, the eNB shows the RNTI of the UE in the predefined system information block. When the UE wakes up, it reads the system information block. If the RNTI of the UE is indicated, the UE deactivates the DRX mode and transmits a Continuous Reception Notification message using L1/L2 signaling or MAC signaling to the eNB. On reception of the Continuous Reception Notification message, the eNB will retransmit the data waiting in the buffer to the UE. When the data is acknowledged or HARQ feedback from the UE is received, the eNB removes the RNTI from the system information.

Figure 4A:
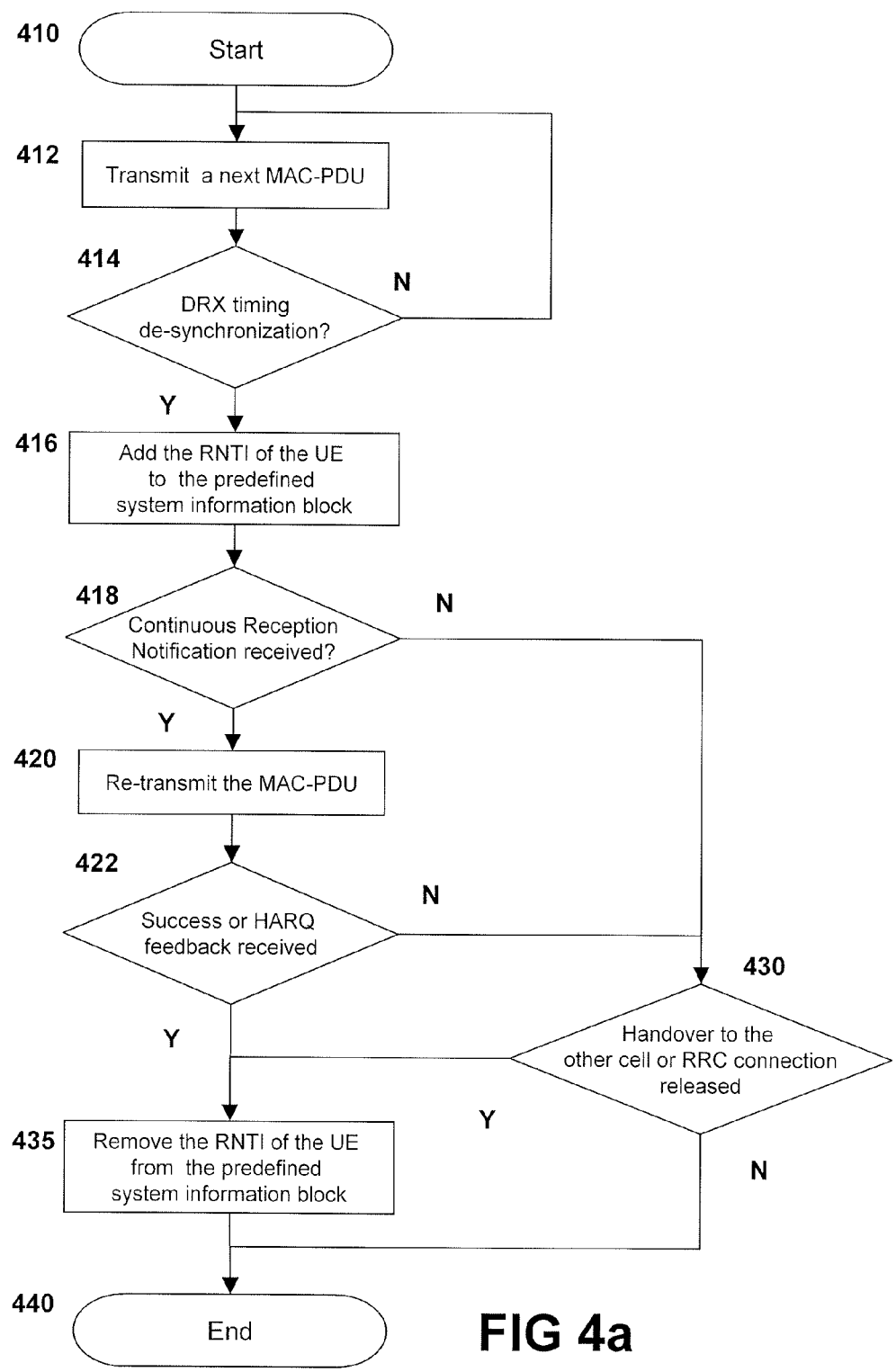
FIG. 4a is a flow chart showing a method for indicating DRX timing de-synchronization within the system information from the eNB side.

Reference is now made to FIG. 4a. FIG. 4a shows a flow chart for a method of signaling the RNTI in the system information to recover from DRX de-synchronization. The process starts at step 410.

The process proceeds to step 412 in which the eNB transmits the next MAC-PDU.

The process then proceeds to step 414 in which it checks whether a DRX timing de-synchronization has occurred. As indicated above, this could be if the eNB gets no HARQ feedback signals from the UE, in which case the eNB may consider that the UE is out of synchronization in DRX timing.

If no DRX timing de-synchronization is detected in step 414, the process proceeds back to step 412 continues until a DRX timing de-synchronization is detected.

If a DRX timing de-synchronization is detected in step 414, the process proceeds to step 416 in which the RNTI of the UE is added to a predefined system information block. As will be appreciated, the UE, when waking up from DRX, will check the system information and detect its RNTI, as described with reference to FIG. 4b below.

From step 416 in FIG. 4a, the process then waits for a Continuous Reception Notification message. If a Continuous Reception Notification message is received in step 418, the process proceeds to step 420 in which it retransmits the MAC-PDU. As will be appreciated, this may be the same MAC-PDU that the eNB attempted to transmit in step 412 before a DRX timing de-synchronization was detected in step 414. The retransmission of the MAC-PDU occurs in step 420.

The process then proceeds to step 422 in which it checks whether a success or HARQ feedback is received.

If, in step 418, a Continuous Reception Notification message is not received, or in step 422 if success or HARQ feedback is not received, the process proceeds to step 430 in which a check is made to see whether a handover has occurred or whether the RRC connection is released.

If a handover to another cell is detected or the RRC connection is found released in step 430, the process proceeds to step 435 in which the RNTI of the UE is removed from the predefined system information block. Similarly, if success is achieved or HARQ feedback is received from step 422, the process proceeds to step 435 in which the RNTI of the UE is removed from the predefined system information block.

The process then proceeds from step 435 to step 440 in which it is ended.

Alternatively, if handover to another cell or the RRC connection release is found in step 430, the process proceeds to step 440 in which it is ended.

Figure 4B:
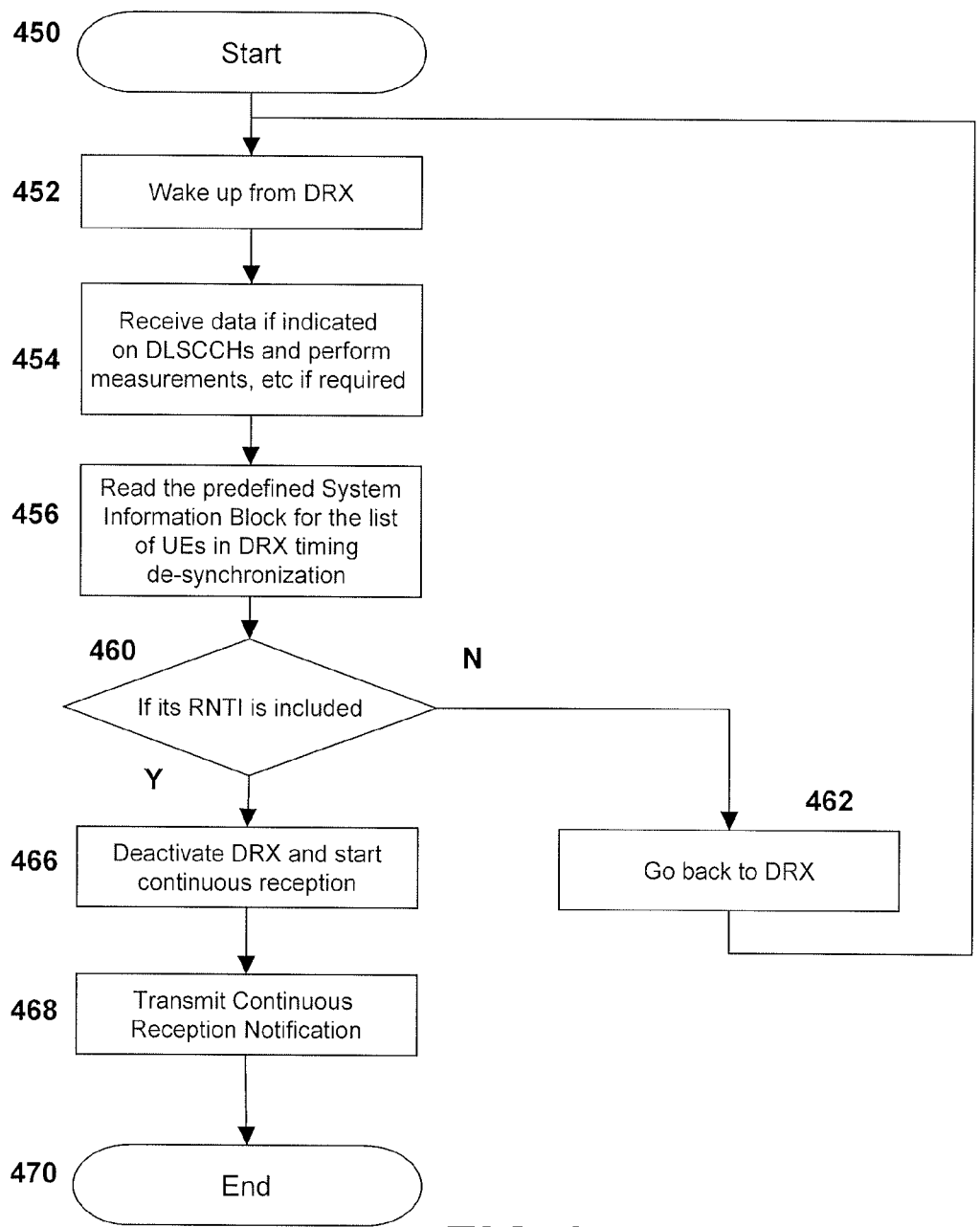
FIG. 4b is a flow chart showing a method of realizing DRX timing de-synchronization within the system information from a UE side.

Reference is now made to FIG. 4b. On the UE side, the process starts at step 450.

In step 452, the UE wakes up from DRX.

The process then proceeds to step 454 in which the UE receives data if indicated on the downlink shared control channels (DLSCCHs) and performs measurements or other functions as required.

The process then proceeds to step 456 in which it reads a pre-defined system information block for a list of UEs in DRX timing de-synchronization.

The process then proceeds to step 460 in which it checks whether the RNTI of the UE is included in the list of UEs in the system information block. If no, the UE proceeds back to DRX in step 462 and then waits for the DRX wake up in step 452.

Alternatively, from step 460, if the RNTI of the UE is included in the system information block, the process proceeds to step 466 in which DRX is deactivated and continuous reception is started.

The process then proceeds to step 468 in which a Continuous Reception Notification is transmitted and the process ends in step 470.

As will be appreciated from the above, the de-synchronization is therefore recovered at the next DRX cycle by the UE detecting its RNTI in the predefined system information block.

Preconfigured Wake Up Time for Recovery from Possible DRX Timing De-Synchronization In a further embodiment, when a radio bearer for the interactive or background communication is established or DRX is activated on that bearer, an absolute wake up time can be notified to the UE by RRC. The absolute wake up timing is defined by the radio frame offset (ARFoff) to the system radio frame timing and DRX interval (AINT). Regardless of the current DRX setting, the UE must wake up at the radio frame of ARFoff+N*AInt where N is an integer. Reference is now made to FIG. 5a.

The process starts at step 510 and proceeds to step 512 in which the next MAC-PDU is transmitted.

The process then proceeds to step 514 in which the eNB checks to see whether timing de-synchronization for DRX has occurred. As indicated above, this could occur based on the lack of receipt of HARQ feedback from the UE.

If DRX timing de-synchronization is not detected in step 514, the process proceeds back to step 512 and continues transmitting the next MAC-PDU.

From step 514, if DRX timing de-synchronization is detected, the process proceeds to step 520 in which a Continuous Reception Command is transmitted at the absolute wake up time configured by the radio resource control.

The process then proceeds to step 522 in which it checks whether a Continuous Reception Response was received from the UE. If yes, the process proceeds to step 524 in which the MAC-PDU from step 512 for which no HARQ feedback was received is retransmitted in step 524.

The process then proceeds to step 526 in which it checks whether there has been success or whether HARQ feedback was received. If yes, the process ends at step 530.

If, from step 522, Continuous Reception Response was not received or, from step 526, the HARQ feedback was not received or no success was determined, the process proceeds to step 540 in which a check is made to see whether a handover has occurred or the RRC connection has been released.

If it is determined in step 540 that a handover has occurred or the RRC connection has been released, the process proceeds to step 530 and ends.

If, in step 540, it is determined that no handover has occurred or the RRC connection has been released, then the process proceeds to step 542 in which it checks whether a retry period is over. If no, then the process proceeds back to step 520. If yes, the process proceeds to step 544 in which the RRC connection is released and the process then ends at step 530.

Figure 5B:
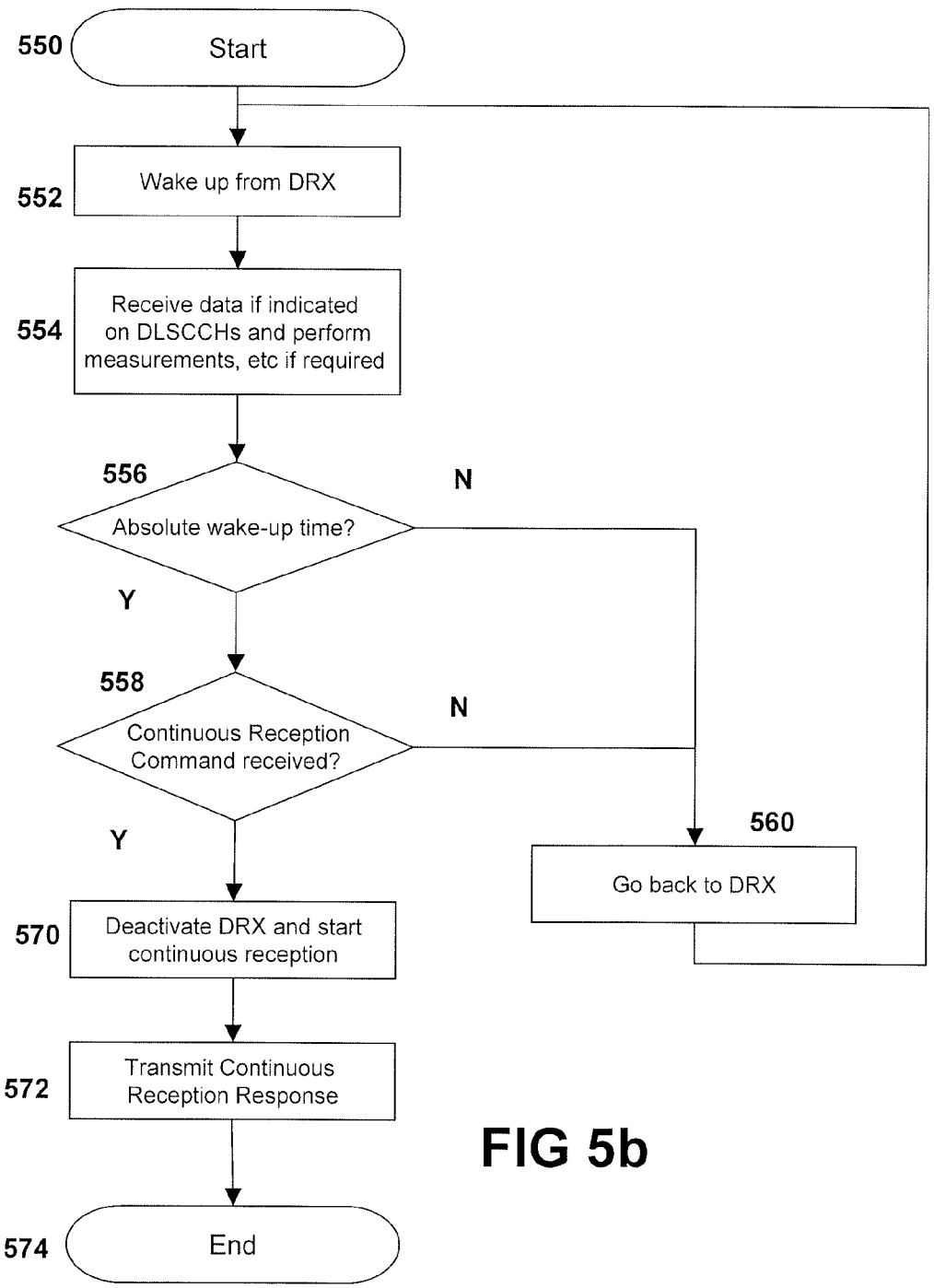
FIG. 5b is a flow chart showing a method for preconfigured wake up time recovery from possible DRX timing de-synchronization from the UE perspective.

Reference is now made to FIG. 5b. From the UE perspective, the process starts at step 550 and proceeds to step 552 in which the UE wakes up from a DRX. The process then proceeds to step 554 in which it receives data if indicated on the downlink shared control channels (DLSCCHs) and performs measurements or other functions if required.

The process then proceeds to step 556 in which it checks whether the time is an absolute wake up time. If yes, the process proceeds to step 558, which the UE checks whether a Continuous Reception Command has been received.

From step 556, if it is not an absolutely wake up time or step 558, if not Continuous Reception Command has been received, the process proceeds to step 560 in which the UE goes back into DRX. From step 560, the process continues by waking up from DRX in step 552.

Alternatively, if a Continuous Reception Command is received in step 558, the process proceeds to step 570 in which DRX is de-activated and continuous reception is started. The process then proceeds to step 572 in which the Continuous Reception Response is transmitted and the process ends at step 574.

Based on the above, when the eNB detects that the UE is out of synchronization in DRX timing, the eNB sends a Continuous Reception Command in L1/L2 signaling or MAC signaling to the UE at an absolute wake up time. The UE wakes up at the absolute wake up time, checks if a Continuous Reception Command is received or not, and if yes, the UE turns on the power to its transceivers and goes back into continuous reception.

In a further alternative, the absolute wake up radio frame offset ARFoff can be calculated from the UE identities such as IMSI in a similar manner that the paging occasion is calculated in UMTS which is described in 3GPP TS25.304. In such a case, the DRX interval may be included in the system information rather than saved via dedicated RRC messages.

As will be appreciated, the benefit of signaling the ARFoff to the UE is that the eNB could align the absolute wake up time with the current DRX setting so that further battery savings can be achieved.

The embodiments described herein are examples of structures, systems or methods having elements corresponding to elements of the techniques of this disclosure. This description may enable those skilled in the art to use embodiments having alternatives elements that likewise correspond to the elements or the techniques of this disclosure. The intended scope of the techniques of this disclosure thus include other structures, systems or methods that do not differ from the techniques of this disclosure as described herein, and further include other structures, systems or methods with insubstantial differences from the techniques of this disclosure as described herein.

The invention claimed is:

1. A method for operating a user equipment (UE) in a wireless communication network, wherein the method is performed by the UE, the method comprising:
    while the UE is in a Discontinuous Reception (DRX) operation, waking up a receiver of the UE at a wake up time based on an offset plus N times a DRX interval, wherein N is an integer greater than or equal to zero; and
    checking whether data addressed for the UE is available from a network element while the UE is awake.

2. The method of claim 1, further comprising: receiving a radio resource control (RRC) protocol message including at least one of the offset or the DRX interval.

3. The method of claim 1, further comprising: increasing the DRX interval if no data is received after a predetermined time period.

4. The method of claim 3, wherein the predetermined time period is based on a set number of DRX cycles.

5. The method of claim 1, wherein the UE is configured to be associated with a Long Term Evolution (LTE) network.

6. A user equipment (UE) for operating in a wireless communication network, the UE comprising:
    a wireless receiver; and
    a processor,
    wherein, while the UE is in a Discontinuous Reception (DRX) operation, the UE is configured to wake up the receiver at a wake up time based on an offset plus N times a DRX interval, where N is an integer greater than or equal to zero, and
    wherein the UE is further configured to check whether data addressed for the UE is available from a network element while the UE is awake.

7. The user equipment of claim 6, wherein the UE is further configured to receive a radio resource control (RRC) protocol message including at least one of the offset or DRX interval.

8. The user equipment of claim 6, wherein the UE is further configured to increase the DRX interval if no data is received after a predetermined time period.

9. The user equipment of claim 8, wherein the predetermined time period is based on a set number of DRX cycles.

10. The user equipment of claim 6, wherein the UE is configured to be associated with a Long Term Evolution (LTE) network.

11. An enhanced Node B (eNB) for operating in a wireless communication network, the eNB comprising:
    a communications subsystem configured to communicate with a user equipment (UE) to configure the UE such that, while the UE is in a Discontinuous Reception (DRX) operation, the UE wakes up at a wake up time based on an offset plus N times a DRX interval, wherein N is an integer greater than or equal to zero,
    wherein the eNB is configured to send data to the UE while the UE is awake.

12. The eNB of claim 11, wherein the eNB is configured to transmit a radio resource control (RRC) protocol message including at least one of the offset or DRX interval.

13. The eNB of claim 11, wherein the eNB is part of a Long Term Evolution (LTE) network.

14. A method for operating an enhanced Node B (eNB) in a wireless communication network, wherein the method is performed by the eNB, the method comprising:
    communicating with a user equipment (UE) to configure the UE such that, while the UE is in a Discontinuous Reception (DRX) operation, the UE wakes up at a wake up time based on an offset plus N times a DRX interval, wherein N is an integer greater than or equal to zero, and
    sending data to the UE while the UE is awake.

15. The method of claim 14, wherein communicating with the user equipment comprises transmitting a radio resource control (RRC) protocol message including at least one of the offset or DRX interval.

16. The method of claim 14, wherein the eNB is part of a Long Term Evolution (LTE) network.

* * * * *